Figure 1:
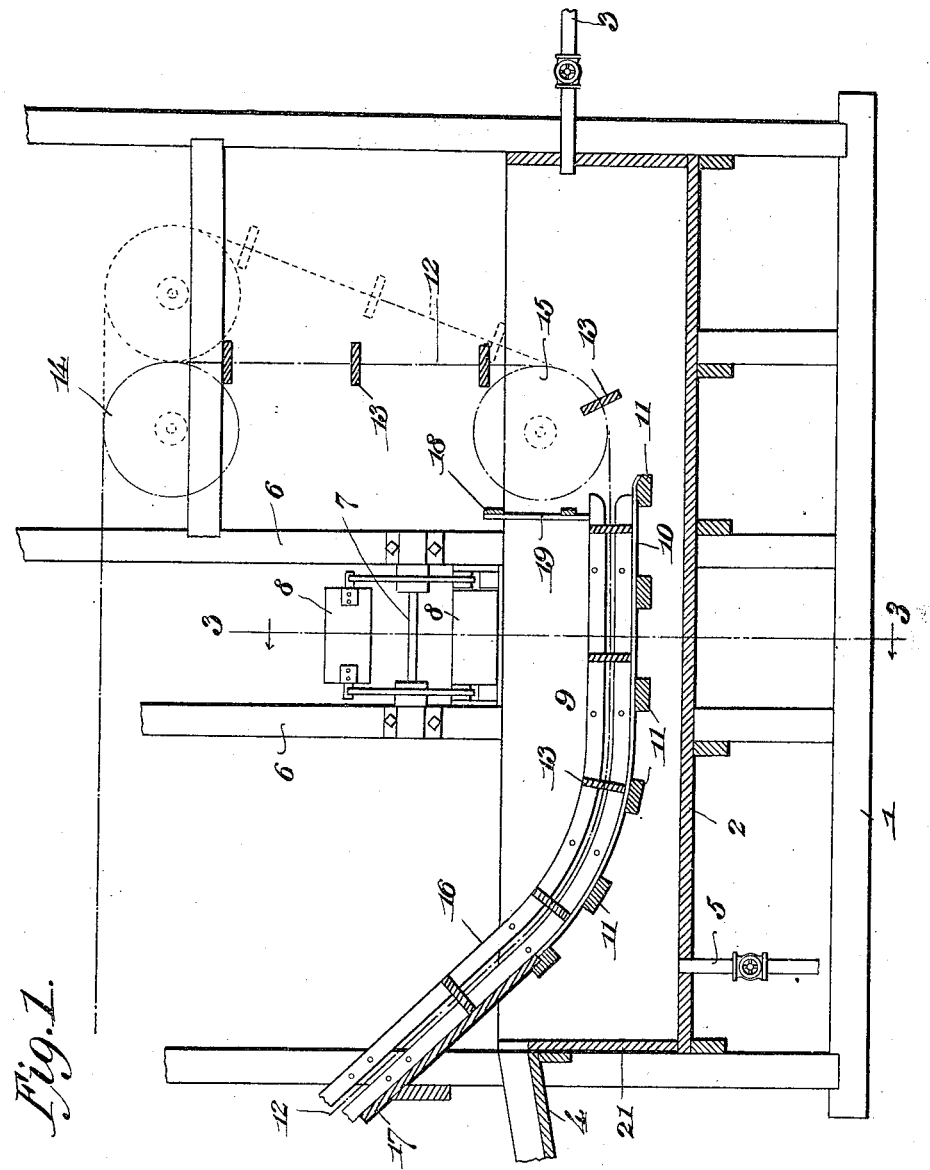

L. O. MILLER.
WASHER.
APPLICATION FILED FEB. 13, 1913.

1,130,531.

Patented Mar. 2, 1915.
2 SHEETS—SHEET 1.

Witnesses
N. N. Lybrand
Stanley O. Cook

Inventor
Luther O. Miller
By H. H. Bliss
Attorney

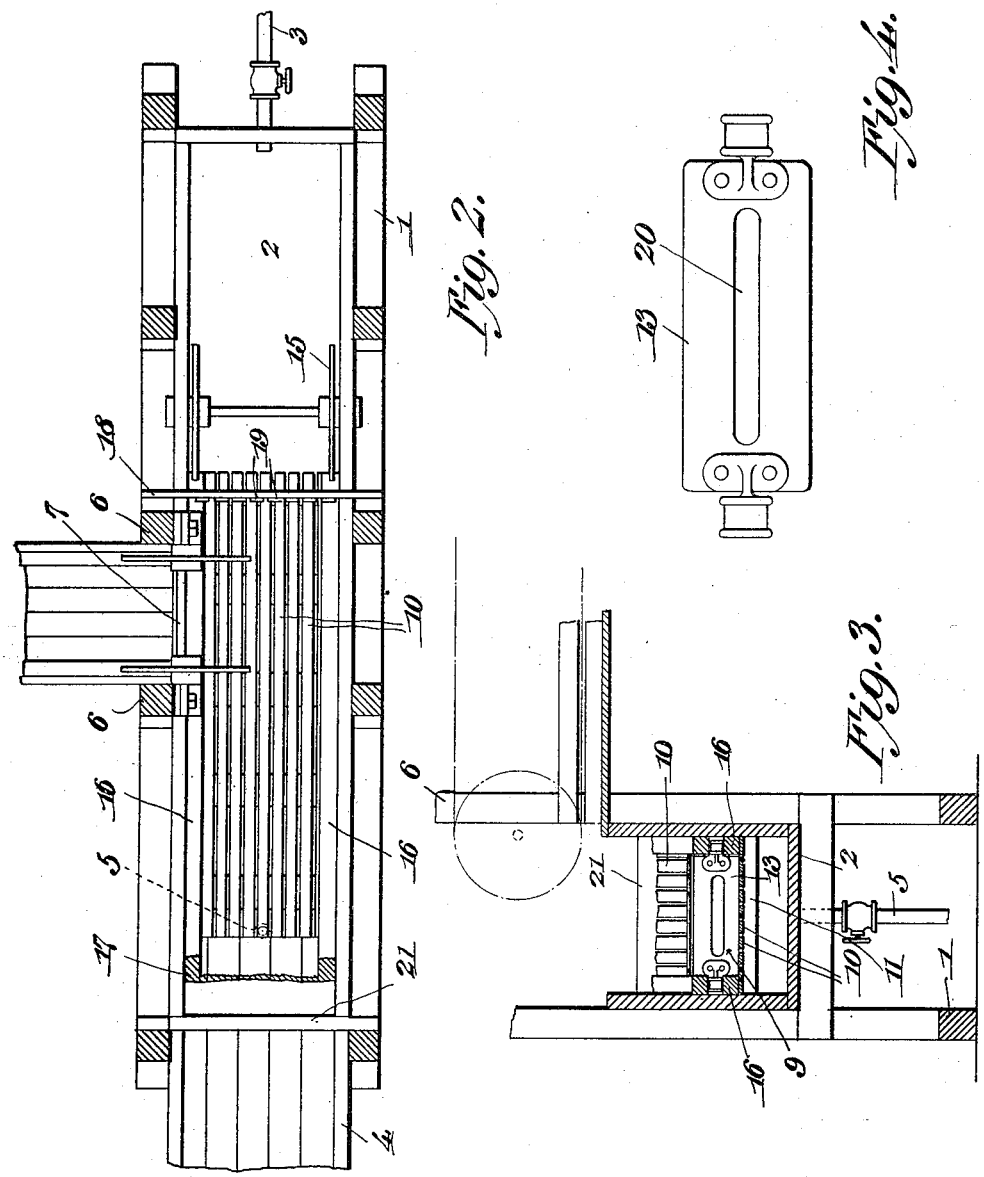

UNITED STATES PATENT OFFICE.

LUTHER O. MILLER, OF COLUMBUS, OHIO, ASSIGNOR TO THE JEFFREY MANUFACTURING COMPANY, OF COLUMBUS, OHIO, A CORPORATION OF OHIO.

WASHER.

1,130,531.  Specification of Letters Patent.  Patented Mar. 2, 1915.

Application filed February 13, 1913. Serial No. 748,152.

*To all whom it may concern:*

Be it known that I, LUTHER O. MILLER, a citizen of the United States, residing at Columbus, in the county of Franklin and State of Ohio, have invented certain new and useful Improvements in Washers, of which the following is a specification, reference being had therein to the accompanying drawing.

This invention relates to washing machines and particularly to those adapted for the washing of the corn. It has been found that ordinarily with washers such as heretofore used corn has to be rewashed and picked over by hand when a fine product is desired, as the machines heretofore used have not been sufficiently thorough in their operation as to remove all silk fibers and other refuse from the husked ears.

One object of my invention is to provide a machine which thoroughly washes and cleanses ears of green corn, obviating the necessity of picking over by hand.

Another object is the refinement of such machines so that the ears of corn are not injured or bruised in passing through the cleansing operation.

These objects are accomplished primarily by the provision of conveyer flights of improved form, as hereinafter fully set forth.

In the drawings,—Figure 1 is a vertical longitudinal sectional view through my improved machine. Fig. 2 is a partial plan view with parts broken away. Fig. 3 is a transverse vertical section on the line 3—3, of Fig. 1; and Fig. 4 is a detail view of one of the conveyer flights.

Referring to the drawings, 1 indicates a base or support on which is mounted an elongated rectangular wooden tank 2. This tank contains the water through which the corn is passed, and all refuse, silk or parts of husks remaining on the ears after having passed through the husking machine either settles to the bottom of the tank, or floats off on the surface of the water to the overflow. A valved inlet pipe 3 is connected with the tank at its rear end and supplies water in sufficient quantities to provide a slow running stream which overflows in an inclined spout 4 at the opposite end. A valved drain pipe 5 opens into the bottom of the tank and is provided for the purpose of periodically drawing off the sediment and refuse which is collected. Mounted at one side of the tank is a framework 6 which carries the head wheel 7 of a scraper conveyer 8 by which the corn is conveyed over a husking machine or husking tables to the washing tank. The conveyer 8 is so arranged that it discharges the ears of green corn into the tank at approximately its center.

A conveyer trough indicated in general by the numeral 9 extends from near the center of the tank from points at the rear of the discharge conveyer 8 forward in a horizontal line for a short distance and is then suddenly curved upward and out of the tank over the overflow spout 4. The trough then extends on to the cutters to which the washed corn is delivered. The bottom of the conveyer trough comprises a series of metallic strips 10 which are spaced from each other and supported upon transverse blocks 11 secured to the sides of the tank 2. The spaced strips 10 provide a slotted bottom for the conveyer trough through which the water is free to move under the action of the conveyer flights. The washing conveyer itself comprises the pair of endless chains 12 carrying transverse flights 13 and operating over the adjustable sprocket wheel 14 and the sprocket wheel 15 placed in the tank at the rear of the conveyer trough 9. The flights of the conveyer are approximately equal to the width of the conveyer trough and the chains when in the trough are guided between the strips 16—16 secured directly to the sides of the tank. The metallic strips 10 terminate at approximately the water level and the bottom of the conveyer trough as continued on from this point is a solid wooden plank 17.

Near the inner end of the conveyer trough 9 and at the rear of the point of discharge from the conveyer 8 is placed a transverse block 18 from which depends a series of slats 19 forming a grating to prevent the ears of corn from working backward in the tank and coming in contact with the sprockets 15.

The conveyer flights are provided with elongated central apertures 20 as illustrated in Figs. 3 and 4. By providing these relatively large apertures at the centers of the conveyer flights a stream or current of water is caused to flow toward the center of the conveyer trough which tends to keep the ears of corn away from the conveyer chain guides and thus prevent not only the clogging and stoppage of the guides but also prevent injury to the ears. The upward inclined stretch for the conveyer trough 9 is spaced away from the end 21 of the tank 2 so that refuse or waste forced between the strips 10 by the current set up by the moving flights may rise to the surface at this point and be easily accessible for scraping over the spout 4. The water is quite violently agitated by the movements of the flights and tumbles the corn in such a manner that all foreign matter and silk fibers are thoroughly washed off. The free working of the apparatus and particularly the thoroughness with which it performs its operation without injury to the corn is due particularly to the central enlarged opening formed in the conveyer flights and the arrangement of the slotted bottom of the trough in which the conveyer operates.

What I claim is:—

1. In a washer of the sort described, the combination of a trough adapted to be filled with water, and a conveyer movable through the trough and having flat flights perpendicular to the sides and bottom of the trough and with their edges closely adjacent thereto, each of the said flights having a large central aperture and being imperforate between its edges and the said aperture.

2. In a washer of the sort described, the combination of a trough having openings in its bottom, a tank inclosing the trough and adapted to be filled with water to a level as high as the top of the trough, and a conveyer movable through the trough and having flat flights perpendicular to the sides and bottom and with their edges closely adjacent thereto, each of these said flights having a large central aperture and being imperforate between its edges and the said aperture.

3. In a washer of the sort described, the combination of a trough having longitudinal slots in its bottom, a tank inclosing the trough and adapted to be filled with water to a level as high as the top of the trough, and a conveyer movable through the trough and having flat flights perpendicular to the sides and bottom of the trough and with their edges closely adjacent thereto, each of the said flights having a large central aperture and being imperforate between its edges and the said aperture.

4. In a washer of the sort described, the combination of a trough adapted to be filled with water and having longitudinal grooves in its side walls, and a conveyer movable through the trough and having chains positioned in the said grooves and flat flights perpendicular to the sides and bottom of the trough and with their edges closely adjacent thereto, each of the said flights having a large central aperture and being imperforate between its edges and the said aperture.

5. In a washer of the sort described, the combination of a trough adapted to be filled with water, a conveyer movable through the trough and having flat flights perpendicular to the sides and bottom of the trough and with their edges closely adjacent thereto, the spaces between the flights being exposed at their tops, and a feed conveyer for delivering articles to be washed to the water above the said exposed spaces, the said articles settling downward through the water into the said spaces.

6. In a washer of the sort described, the combination of a trough adapted to be filled with water, a conveyer movable through the trough and having flat flights perpendicular to the sides and bottom of the trough and with their side and bottom edges closely adjacent thereto, the spaces between the flights being exposed at their tops, a feed conveyer for delivering articles to be washed to the water above the said exposed spaces, the said articles settling downward through the water into the said spaces, and a partition adjacent the place of delivery of the feed conveyer for confining the articles and guiding them into the said spaces.

In testimony whereof I affix my signature, in presence of two witnesses.

LUTHER O. MILLER.

Witnesses:
C. M. HANNAN,
J. D. COPLEY.

Copies of this patent may be obtained for five cents each, by addressing the "Commissioner of Patents, Washington, D. C."